United States Patent
Kaushal

Patent Number: 5,137,789
Date of Patent: Aug. 11, 1992

[54] COMPOSITE CERAMIC AND METAL ARTICLE

[75] Inventor: Tony S. Kaushal, Peoria, Ill.

[73] Assignee: Caterpillar Inc., Peoria, Ill.

[21] Appl. No.: 621,121

[22] Filed: Dec. 3, 1990

[51] Int. Cl.$^5$ .................... B33B 15/04; B33B 9/00; F01N 7/10; B28B 1/26

[52] U.S. Cl. .................... 428/472; 428/346; 428/325; 428/472.1; 428/472.2; 428/697; 60/232; 60/272; 264/86; 29/888.061

[58] Field of Search ............... 428/614, 404, 472, 34.6, 428/35.8, 325, 472.1, 472.2, 697, 701, 632, 633; 264/86, 219; 164/91, 105; 60/272, 323; 29/888.061

[56] References Cited

U.S. PATENT DOCUMENTS

| | | |
|---|---|---|
| 1,655,149 | 1/1928 | Lee . |
| 2,255,807 | 12/1940 | Towler ................. 123/173 |
| 3,461,944 | 8/1969 | Kuebrich ............... 428/632 |
| 3,709,772 | 1/1973 | Rice .................... 161/139 |
| 3,786,795 | 1/1974 | Kaneko et al. ......... 123/193 |
| 3,864,908 | 2/1975 | Leltaye ................ 60/272 |
| 3,919,755 | 11/1975 | Kaneko ................. 29/156.4 |
| 3,949,552 | 4/1976 | Kaneko et al. ......... 60/282 |
| 4,167,207 | 9/1979 | Rao et al. ............. 164/9 |
| 4,168,610 | 9/1979 | Engquist ............... 60/322 |
| 4,243,093 | 1/1981 | Nieman ................. 164/96 |
| 4,277,539 | 7/1981 | Keller et al. .......... 428/450 |
| 4,307,198 | 12/1981 | Oda et al. ............. 501/119 |
| 4,316,965 | 2/1982 | Oda et al. ............. 501/112 |
| 4,346,556 | 8/1982 | Rie et al. ............. 60/272 |
| 4,648,243 | 3/1987 | Korkemeier ............. 60/272 |
| 4,676,064 | 6/1987 | Narita et al. .......... 60/272 |
| 4,950,627 | 8/1990 | Tokarz et al. .......... 428/34.6 |
| 4,972,674 | 11/1990 | Yamada et al. .......... 60/272 |
| 5,013,501 | 5/1991 | Fukao et al. ........... 264/86 |

OTHER PUBLICATIONS

Report of the Research Laboratory of Engineering Materials, Tokyo Institute of Technology, Uytaka Ohya et al., Effects of Some Additives on Microstructures and Mechanical Strength of Aluminum Titanate Ceramics, No. 12, 1987, pp. 81–91.

*Primary Examiner*—Ellis P. Robinson
*Assistant Examiner*—Frank Rosenberg
*Attorney, Agent, or Firm*—Robert A. McFall

[57] ABSTRACT

A composite ceramic and metal article having a thermal insulating component formed of single phase magnesium stabilized aluminum titanate and an in situ cast structural component formed of a high melting temperature metallic material. The composite article is particularly useful as exhaust port and manifold structures in internal combustion engines.

5 Claims, 2 Drawing Sheets

COMPOSITE CERAMIC AND METAL ARTICLE

TECHNICAL FIELD

This invention relates generally to a composite article having thermal insulating and structural components, and more particularly to a thermally insulating composite article having a structural component formed of a cast material.

BACKGROUND ART

The efficiency of internal combustion engines is a direct function of the maximum thermodynamic cycle temperature of the engine. Consequently, many arrangements have been proposed for providing engine components that improve the thermal efficiency of the engine. In particular, it is well known that a thermal barrier placed near engine exhaust ports or in an exhaust manifold can significantly improve the energy efficiency of an engine.

Many attempts have been made to provide economical and effective thermally insulating members for internal combustion engines. For example, U.S. Pat. No. 1,655,149 issued Jan. 3, 1928 to C. L. Lee describes the use of a heat insulating material such as lava, porcelain, mica or asbestos as an engine exhaust duct lining. Lee proposes forming a lining as a single piece, cutting the exhaust duct in two to permit insertion of the lining, and then rejoining the duct elements together by welding. This process is costly and produces an exhaust duct having undesirable thermally induced stresses resulting from the welding operation.

To solve the problem of separating and rejoining the engine components, it has been proposed that the thermal insulating member be cast in situ with the engine member. For example, U.S. Pat. No. 3,786,795 issued Jan. 22, 1974 to Y. Kaneko et al describes an engine exhaust port construction in which a prefabricated thermally insulating member, constructed of a rigid ceramic material, is placed in a casting mold and then enveloped by molten aluminum. Similar arrangements are shown in U.S. Pat. No. 4,277,539, issued Jul. 7, 1981 to H. Keller et al, and U.S. Pat. No. 4,648,243 issued Mar. 10, 1987 to H. Korkemeir.

Because of physical strength limitations of the heretofore proposed rigid ceramic members, the metallic component of each of these constructions is formed of materials having relatively low melting temperatures, such as aluminum. Because of the relatively low temperature at which such materials are poured, these materials inherently impose lower contraction forces on an enclosed ceramic member during casting solidification than those forces imposed by higher melting temperature metallic materials, such as cast iron. Consequently, ceramic and metallic composite articles, formed by casting the metallic component about a rigid ceramic component, have heretofore been limited to the use of relatively low melting temperature materials, such as aluminum, for the metallic component of the composite article.

One solution to in situ casting of higher melting temperature metallic materials and ceramic components has been to form the ceramic component of materials that are crushable, deformable or porous. Typically, such deformable ceramic materials are enclosed between a metal sleeve and the cast component. For example, U.S. Pat. No. 2,225,807 issued Dec. 24, 1940 to C. Towler describes an asbestos thermal barrier member. Alternatively, U.S. Pat. No. 3,919,755 issued Nov. 18, 1975 to Y. Kaneko discloses a composite article in which the metallic component is cast in situ with a flexible ceramic liner.

U.S. Pat. No. 4,243,093, issued Jan. 6, 1981 to J. Nieman and assigned to the assignee of the present invention, discloses an engine manifold having inner and outer cast metallic members with an insulative portion disposed between the inner and outer members. The insulative portion of this article must necessarily be formed of a yieldable material to permit shrinkage of both the inner and outer cast members during solidification.

Insulative members constructed of porous ceramic materials must be protected by an impermeable barrier to prohibit the infiltration of hot engine gases which could cause a physical breakdown of the inner member and destruction of the bond between the member and a supporting metallic structural component. Similarly, crushable or flexible ceramic materials do not have sufficient strength properties to resist erosion during extended operation.

The present invention is directed to overcoming the problems set forth above. It is desirable to have a thermally insulating composite article that has a rigid, high strength, inner member. It is also desirable to have an outer structural member, or component, that is formed of a material that has a high melting temperature and is cast, in situ, with the inner member.

DISCLOSURE OF THE INVENTION

In accordance with one aspect of the present invention, a composite article has a preformed thermal insulating component formed of single phase magnesium stabilized aluminum titanate, and a structural component formed of a metallic material having a melting temperature greater than about 980° C. (1800° F.) and cast in situ with the thermal insulating component.

Other features of the composite article include a structural component that is formed of cast iron and a thermal insulating component that has a chemical composition represented by the formula: $MgAl_{(2-2x)}Ti_{(1+x)}O_5$, where $0 < x < 1$.

In another aspect of the present invention, a method of forming a composite article having thermal insulating and structural components includes blending alumina, magnesia and titanium dioxide powders together in proportional amounts represented by the formula $Mg_xAl_{(2-2x)}Ti_{(1+x)}O_5$, where $0 < x < 1$. The blended powders are then compacted to form a densified thermal insulating component which is reactively sintered in an air atmosphere to transform the compacted powders to magnesium stabilized aluminum titanate having a single phase crystal structure. The compacted and sintered insulating component is then placed in a mold, after which a molten metallic material having a melting temperature greater than 980° C. (1800° F.) is poured into the mold.

In yet another aspect of the present invention, a method of forming a composite article having thermal insulating and structural components includes blending alumina, magnesia and titanium dioxide powders together in proportional amounts represented by the formula $Mg_xAl_{(2-2x)}Ti_{(1+x)}O_5$, where $0 < x < 1$. The blended powders are then reactively sintered to form a solid solution which, upon cooling, has a single phase crystal structure. The sintered powder is crushed to form a plurality of particles having a grain size of from about 45 μm (0.002 in) to about 150 μm (0.006 in) and then deposited, by plasma spray onto a substrate member to form a thermal insulating component having an outer layer comprising single phase magnesium stabilized aluminum titanate. The thus formed thermal insulating component is placed in a mold, after which a molten metallic material having a melting temperature greater than 980° C. (1800° F.) is poured into the mold.

BEST MODE FOR CARRYING OUT THE INVENTION

Figure 1:
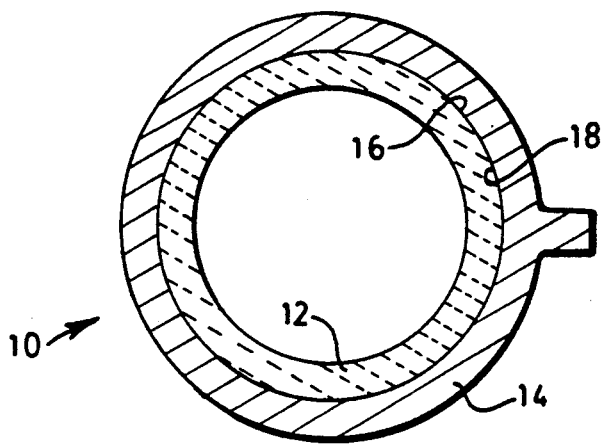
FIG. 1 is a sectional view of a composite article embodying the present invention.

In the preferred embodiment of the present invention, a composite article 10 includes an inner thermal insulating component 12 and an outer structural component 14. The thermal insulating component 12 is formed as a separate member and then placed in a mold prior to pouring molten metal therein. Upon cooling, the in situ cast metal material solidifies and forms the outer structural component 14 of the composite article 10, as shown in FIG. 1.

The thermal insulating component 12 is formed of a single phase magnesium stabilized aluminum titanate material having a composition represented by the formula $Mg_xAl_{(2-2x)}Ti_{(1+x)}O_5$, where $0<x<1$. Single phase magnesium stabilized aluminum titanate has significantly greater thermal stability and thermal shock resistance than multiple phase magnesium-aluminum-titanate compositions. Preferably, the single phase magnesium stabilized aluminum titanate is formed by reaction sintering according to the following illustrative examples.

The outer structural component 14 is formed of a metal having a relatively high melting temperature, i.e., greater than about 908° C. (1800° F.), such as iron or steel. In the following examples, the cast structural component 14 was constructed of cast gray iron which has a pouring temperature of about 1370° C. (2500° F.)

EXAMPLE 1

In this example, the thermal insulating component 12 of the composite article 10 was formed by a two step process including isostatic forming prior to reaction sintering. First, the following powders, by weight percent, were blended to form a homogeneous mixture represented by the formula: $Mg_{0.2}Al_{1.6}Ti_{1.2}O_5$.

| | |
|---|---|
| Alumina (Al$_2$O$_3$) | 44.0% |
| Titanium dioxide (TiO$_2$) | 51.7% |
| Magnesia (MgO) | 4.3% |

It is important that the grain size of the powders be very small, preferably 90% less than 3 μm (0.00012 in). Controlling the grain size, in combination with the subsequent reaction sintering step, will assure that the resultant crystal structure will be sufficiently small, thereby enhancing the thermal shock properties of the component 12 and enabling the component to withstand stresses imposed thereon during the final in situ casting step.

After blending, the alumina, titanium dioxide and magnesia powders were pressed isostatically at a pressure of about 40,000 kPa (5,800 psi) to 105,000 kPa (15,200 psi) and formed into a compacted tubular-shaped article having an internal diameter of about 38 mm (1.5 in) and an outer diameter of about 51 mm (2.0 in). Thus, the compacted article had a wall thickness of about 6.5 mm (0.25 in).

After the isostatic forming step, the compacted green article was reactively sintered in an air atmosphere furnace. The furnace was heated, at a rate of about 300° C. (572° F.) per hour, to a temperature of about 1450° C. (2642° F.) and held at that temperature for about 4 hours. Depending on the size, shape and section thickness of the compacted article, the reaction sintering step may require from about 2 to 6 hours at a temperature of about 1300° C. (2370° F.) to 1550° C. (2820° F.).

After reactive sintering, the article was cooled to room temperature in less than 4 hours. Desirably, the sintered article is cooled at a fairly rapid rate to prevent excessive microcracking. Typically, a cooling rate of about 300° C. (572° F.) to about 450° C. (842° F.) per hour, depending again on section size and total mass, is sufficient to avoid undesirable microcracking during cool down.

After the above densification and sintering steps, a sample taken from a test coupon representative of the isostatically compacted and reactively sintered thermally insulating component 12 was examined by X-ray diffraction and found to essentially have only a single-phase crystal structure that was free of voids, i.e., substantially fully densified. The thermal stability of the compacted and sintered magnesium stabilized aluminum titanate material was tested by placing the representative test coupon in a furnace and held for 100 hours at 1000° C. (1832° F.). After the 100 hour furnace test, the crystal structure of a sample of the coupon was examined by X-ray diffraction and found to still have a single phase crystal structure.

The compacted and sintered thermal insulating component 12 was then machined to conform to predetermined dimensions. Importantly, in the ensuing casting step, an external surface 16 of the thermal insulating component 12 provides a form for shaping an internal surface 18 of the metallic structural member 14.

After placing the sintered thermal insulating component 12 in a mold cavity, molten gray iron, heated to a temperature of about 1370° C. (2500° F.), was poured into the mold cavity around the prepositioned component 12. Upon solidification, the gray iron formed the in situ cast metallic structural component 14 of the composite article 10, as shown in FIG. 1. After removal from the mold, the composite article 10 was sectioned and examined, and the thermal insulating component 12 was found to be free of any undesirable defects.

This example illustrates an important advantage of the present invention. That is, the thermal insulating component 12, constructed of a single phase magnesium stabilized aluminum titanate and formed as outlined above, may be cast with higher melting temperature metallic materials without damage to the thermal insulating component 12. In particular, metallic materials having a melting temperature of above 980° C. (1800°

F.), such as cast iron and steel are particularly suitable for in situ casting with the above described thermal insulating member 12. Previously, such components have been limited to use with lower melting temperature metallic materials, such as aluminum which has a melting temperature of about 660° C. (1220° F.).

EXAMPLE 2

Figure 2:
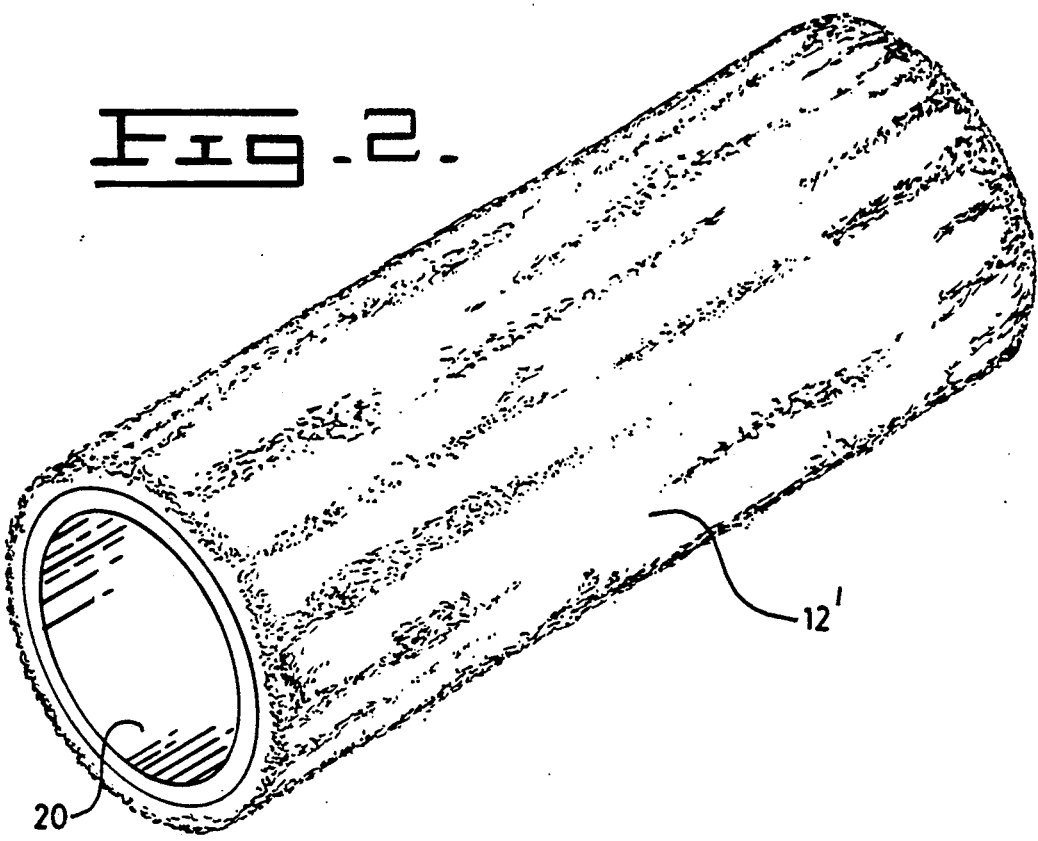
FIG. 2 is a perspective view of a thermal insulating component having an inner sleeve embodying the present invention.

In an alternative embodiment of the present invention, shown in FIG. 2, the preformed thermal insulating component 12' was formed by plasma spray deposition of single phase magnesium stabilized aluminum titanate powder. The powder was formed by blending alumina, magnesia and titanium dioxide powders, in the proportions set forth above in Example 1, and then reactively sintered, crushed and ground to a particle size of about 15 μm )0.0006 in) to about 75 μm (0.003 in). The reactively sintered, single phase, magnesium stabilized aluminum titanate powder was then plasma sprayed onto the outer surface of a steel tube 20 to about a 3 mm (0.12 in) thickness.

The spray-formed thermal insulating component 12', along with the steel tube 20 was then placed together in a mold prior to casting. The mold was then filled with molten gray iron, as described above in Example 1. After solidification and cooling, the composite casting 10 was sectioned and examined. There was no significant damage or deterioration of the thermal insulating component 12'. However, because of differences in the thermal expansion characteristics of the steel tube 20 and the ceramic thermal insulating component 12', there was no bond between the tube 20 and thermal insulating component 12'. Depending upon the particular application, this may, or may not, be a disadvantage in the final cast composite article 10.

Thus, in the embodiment illustrated by this example, the composite article 10 includes an inner metallic member 20 with the thermal insulating component 12' disposed between the inner member 20 and the outer structural component 14.

EXAMPLE 3

Figure 3:
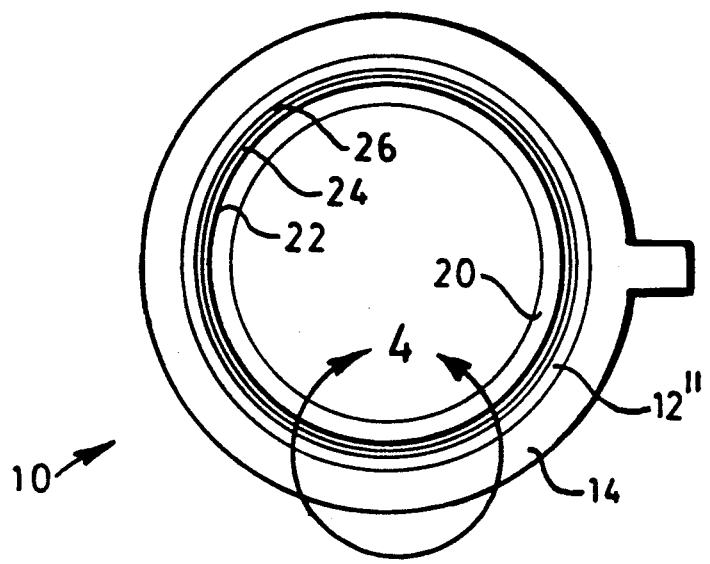
FIG. 3 is a sectional view of a composite article having multiple inner layers embodying the present invention.
Figure 4:
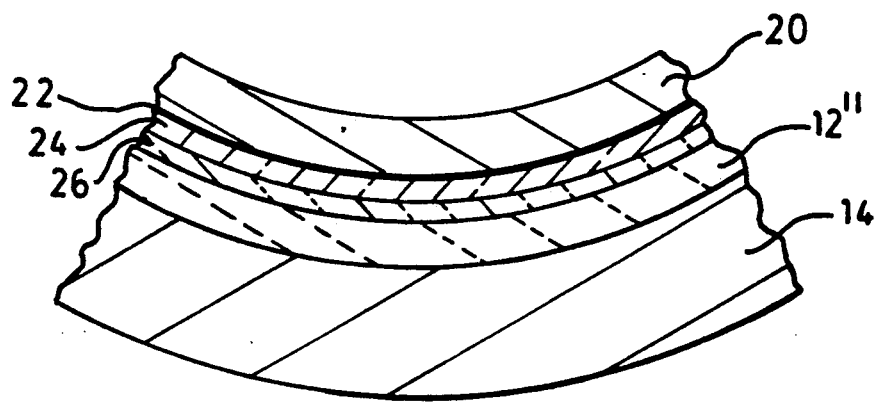
FIG. 4 is an enlarged sectional view of the area encircled by the area 4 of FIG. 3.

In another example, shown in FIGS. 3 and 4, the thermal insulating component 12" was formed by plasma spray deposition, as described above in Example 2. However, in this embodiment, the substrate on which the single phase magnesium stabilized aluminum titanate was deposited, comprised multiple layers of graded materials. As best shown in FIG. 4, a MCrAlY bond coat 22 was plasma sprayed onto a steel tube 20. Specifically, a 0.25 mm (0.01 in) layer 22 of a metallic powder comprising, by weight percent, 17.5% Cr, 5.5% Al, 2.5% Co, 0.5% Y and balance Ni was deposited on the steel tube 20.

Over the bond coat 22, a first transition layer 24, having a thickness of about 1 mm (0.04 in) was formed by plasma spray deposition. The first transition layer 24 comprised a blend of 50% of the bond coat powder and 50% of the reactive sintered, single phase, magnesium stabilized aluminum titanate powder.

Next, a second transition layer 26 having a thickness of about 1 mm (0.04 in) was formed by plasma spray deposition on top of, or over, the first transition layer 24. The second transition layer 26 comprised a blend of 25% bond coat powder and 75% of the reactive sintered, single phase, magnesium stabilized aluminum titanate powder. The thermal insulating member 12", comprising 100% reactively sintered, single phase magnesium stabilized aluminum titanate was formed, as described in Example 2, by plasma spray deposition over the second transition layer 26. In this embodiment, the thermal insulating component 12" had a thickness of about 1.75 mm (0.07 in). Thus, the total of all plasma spray deposited layers, including the bond coat 22, was about 4 mm (0.16 in)

The tube 20, with the bond coat 22, the first and second transition layers 24, 26 and the thermal insulating component 12" deposited thereon, was placed in a mold prior to pouring gray iron into the mold. After solidification and cooling, the composite casting 10 was sectioned and examined. The bond coated tube 20, the transition layers 24, 26, and the thermal insulating component 12" were firmly bonded to each other. Furthermore, there was no observable damage or deterioration of the thermal insulating component 12".

In this embodiment, the composite article 10 includes an inner metallic member 20, the thermal insulating component 12", a metallic bond coat 22, multiple transition layers 24, 26 comprising varying amounts of metallic and ceramic materials, and the metallic structural component 14. This embodiment, although more costly to produce, provides low stress to strength ratios between adjacent layers of the substrate structure, i.e., the transition layers, and between the substrate and the thermal insulating component 12".

Industrial Applicability

Composite articles constructed according to the present invention are particularly useful as exhaust port and manifold liners for internal combustion engines. In particular, the increased thermal stability and thermal shock resistance of the single phase magnesium stabilized aluminum titanate thermal insulating component 12 enables the component 12 to be cast in situ with high melting temperature metallic materials such as cast iron. The presence of the thermal insulating component 12 in the internal exhaust passages of an internal combustion engine improves the efficiency of the engine not only by reducing heat rejection, but also by lowering the temperature of exhaust components thereby permitting the engine to operate at higher temperatures.

Other aspects, objects and advantages of this invention can be obtained from a study of the drawings, the disclosure, and the appended claims.

What is claimed is:

1. A composite article, consisting essentially of:
   a preformed thermal insulating component having an external surface, and being formed of single phase crystalline magnesium stabilized aluminum titanate having a predetermined melting temperature and a chemical composition represented by the formula $Mg_xAl_{(2-2x)}Ti_{(1+x)}O_5$, where $0<x<1$, and;
   an in situ cast metallic structural component having an internal surface conforming to said external surface of the thermal insulating member, and being formed of a metallic material having a melting temperature greater than 980° C. (1800° F.) and less than the predetermined melting temperature of said thermal insulating component formed of single phase magnesium stabilized aluminum titanate.

2. A composite article, as set forth in claim 1, wherein said in situ cast metallic structural component is formed of cast iron.

3. A composite article, as set forth in claim 1, wherein said preformed thermal insulating component formed of single phase magnesium stabilized aluminum titanate having the chemical composition represented by the formula $Mg_xAl_{(2-2x)}Ti_{(1+x)}O_5$, x has a value of about 0.2.

4. A composite article, as set forth in claim 3, wherein said preformed thermal insulating component is constructed of a compacted and reaction sintered blend of alumina, magnesia and titanium dioxide powders.

5. A composite article, as set forth in claim 3, wherein said preformed thermal insulating component is formed by plasma spray deposition of reaction sintered, single phase, magnesium stabilized aluminum titanate powder.

* * * * *